US008880818B2

(12) United States Patent
Ware et al.

(10) Patent No.: US 8,880,818 B2
(45) Date of Patent: *Nov. 4, 2014

(54) RECONFIGURABLE MEMORY CONTROLLER

(71) Applicant: Rambus Inc., Sunnyvale, CA (US)

(72) Inventors: Frederick A. Ware, Los Altos Hills, CA (US); John Eric Linstadt, Palo Alto, CA (US); Venu Madhav Kuchibholta, Campbell, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,635

(22) Filed: Jan. 29, 2014

(65) Prior Publication Data

US 2014/0181331 A1    Jun. 26, 2014

Related U.S. Application Data

(63) Continuation of application No. 13/054,910, filed as application No. PCT/US2009/050590 on Jul. 14, 2009, now Pat. No. 8,683,149.

(60) Provisional application No. 61/083,008, filed on Jul. 23, 2008.

(51) Int. Cl.
*G06F 12/00* (2006.01)
*G06F 3/06* (2006.01)
*G06F 13/16* (2006.01)

(52) U.S. Cl.
CPC ............ *G06F 3/0634* (2013.01); *G06F 3/0673* (2013.01); *G06F 13/1694* (2013.01); *G06F 3/0604* (2013.01)
USPC ............ 711/157; 711/103; 711/104; 711/167

(58) Field of Classification Search
None
See application file for complete search history.

(56) References Cited

U.S. PATENT DOCUMENTS

| 6,044,412 A | 3/2000 | Evoy |
| 7,961,532 B2 | 6/2011 | Ware |

(Continued)

FOREIGN PATENT DOCUMENTS

| EP | 0905631 A2 | 3/1999 |
| EP | 0905631 A3 | 3/2000 |

(Continued)

OTHER PUBLICATIONS

International Preliminary Report on Patentability dated Feb. 3, 2011 (Chapter I) re International Application No. PCT/US2009/050590. 7 pages.

(Continued)

*Primary Examiner* — Shawn X Gu
(74) *Attorney, Agent, or Firm* — Fenwick & West LLP

(57) ABSTRACT

Embodiments of a memory controller are described. This memory controller includes signal connectors, which are electrically coupled to a communication path that includes multiple links, and an interface circuit, which is electrically coupled to the signal connectors. In a first operating mode, the interface circuit communicates with a first memory device via the communication path using spatial multiplexing, in which there are dedicated command/address links and dedicated data links in the communication path. Moreover, in a second operating mode, the interface circuit communicates with a second memory device via the communication path using time multiplexing, in which at least some of the links in the communication path time interleave command/address information and data.

20 Claims, 9 Drawing Sheets

(56) References Cited

U.S. PATENT DOCUMENTS

| | | |
|---|---|---|
| 8,683,149 B2 * | 3/2014 | Ware et al. .................. 711/157 |
| 2002/0118593 A1 | 8/2002 | Takemae |
| 2004/0064599 A1 | 4/2004 | Jahnke et al. |
| 2004/0210715 A1 | 10/2004 | Harari et al. |
| 2007/0033336 A1 | 2/2007 | Oh |
| 2007/0186061 A1 | 8/2007 | Oh et al. |
| 2010/0005217 A1 | 1/2010 | Jeddeloh |
| 2010/0235554 A1 | 9/2010 | Chang et al. |
| 2010/0262790 A1 | 10/2010 | Perego et al. |

FOREIGN PATENT DOCUMENTS

| | | |
|---|---|---|
| EP | 1890294 A2 | 2/2008 |
| EP | 1890294 A3 | 4/2008 |

OTHER PUBLICATIONS

Notification of Transmittal of the International Search report and the Written Opinion of the International Searching Authority mailed Sep. 24, 2009, re PCT/US2009/050590 filed on Jul. 14, 2009. 13 pages.

* cited by examiner

RECONFIGURABLE MEMORY CONTROLLER

TECHNICAL FIELD

The present embodiments relate to memory controllers. More specifically, the present embodiments relate to memory controllers that support communication with memory devices via a communication path using either spatial multiplexing or temporal multiplexing.

BACKGROUND

Many existing computer systems or computing devices include different types of memory, for example, dynamic random-access memory (DRAM) and flash memory, which have different communication formats and/or different signaling rates. Because of size and cost constraints in these systems, it is often useful to communicate with these different types of memory using a minimum number of interface pins.

Some existing systems address this design constraint by including a traditional double-data-rate-style interface to flash memory. In these systems, the flash memory is operated as an independent rank on multi-drop command/address (CA) and data (DQ) links. Unfortunately, on multi-drop links, a double-date-rate-style interface can degrade the signal-integrity and, thus, the communication performance, of these links. This degradation in communication performance can exacerbate problems that arise as a consequence of differences in the signaling rates of the different types of memory.

Hence, there is a need for a device that supports communication with different types of memory without the above-described problems.

BRIEF DESCRIPTION OF THE FIGURES

Note that like reference numerals refer to corresponding parts throughout the drawings.

DETAILED DESCRIPTION

Figure 1:
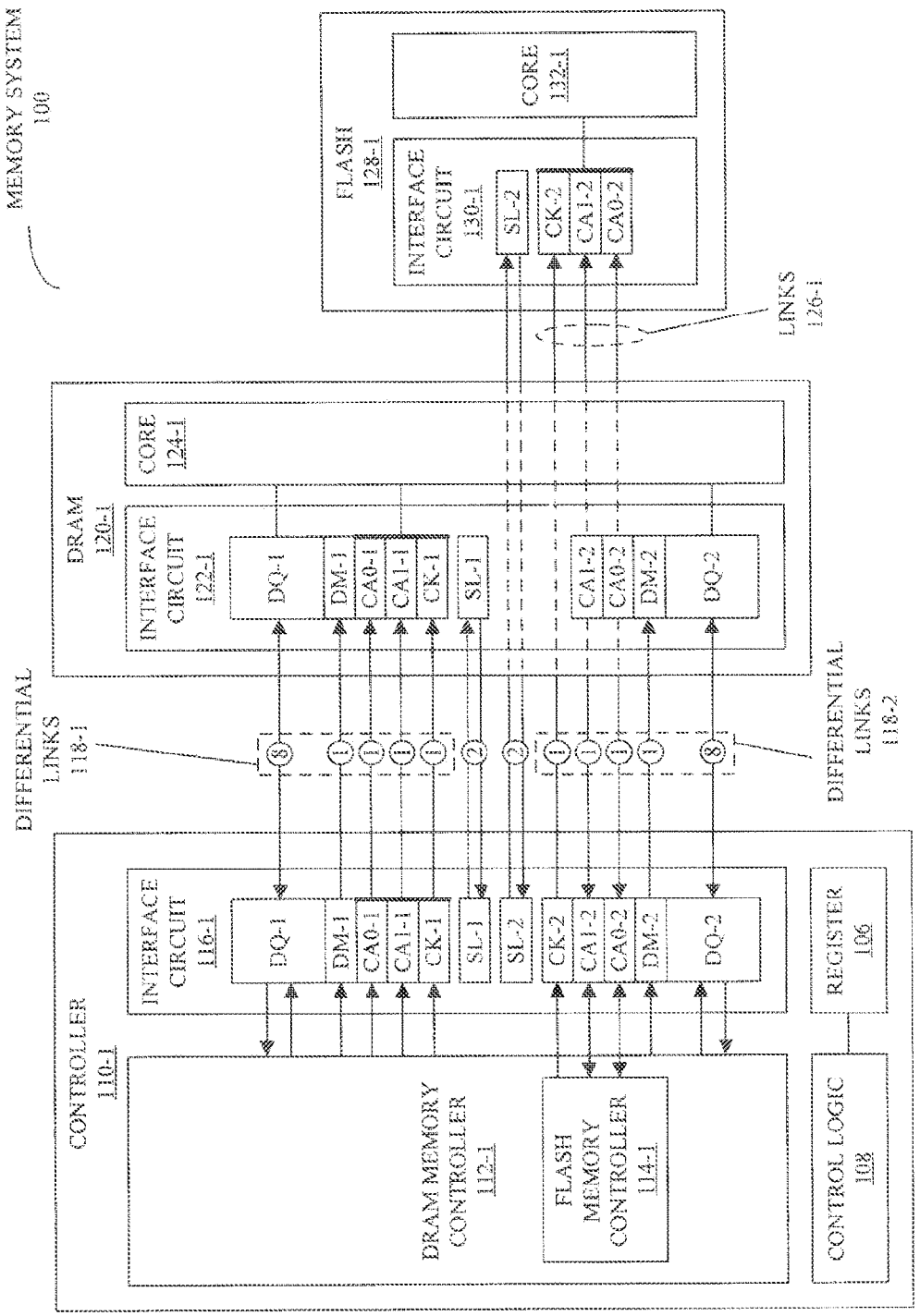
FIG. 1 is a block diagram illustrating an embodiment of a memory system.

FIG. 1 presents a block diagram illustrating an embodiment of a memory system 100 in which an interface circuit 116-1 in a controller 110-1 can be reconfigured in different operating modes to support communication with a variety of memory devices that can have different communication formats (for example, different data-packet sizes (which can include the packet length, such as a number of data transfers, and/or a packet width, such as the bytes per data transfer), a different number of links, and/or different signaling rates). In particular, interface circuit 116-1 can reconfigure CA, DQ and/or clock (CK) links as the memory configuration and capacity are changed in different applications.

As shown in memory system 100, during one operating mode (henceforth referred to as the 'shared-link operating mode', because, as discussed below, at least some of the links are shared) controller 110-1 communicates with flash memory 128-1 using differential links 126-1, which include a dedicated clock link (CK-2) and two bidirectional links for command/address information and data (CA0-2 and CA1-2), i.e., two shared links. These shared links communicate information between controller 110-1 and DRAM 120-1 using time multiplexing in which command/address information and data are time interleaved. Note that interface circuit 116-1, links 126-1 (which include at least two CA/DQ links and one CK link) and interface circuit 130-1 may provide a moderate bandwidth communication channel for flash memory 128-1, which operates at a signaling rate that is less than or equal to the signaling rate of a communication channel for communicating with DRAM 120-1 (which includes interface circuit 116-1, differential links 118-1, and interface circuit 122-1).

Figure 2:
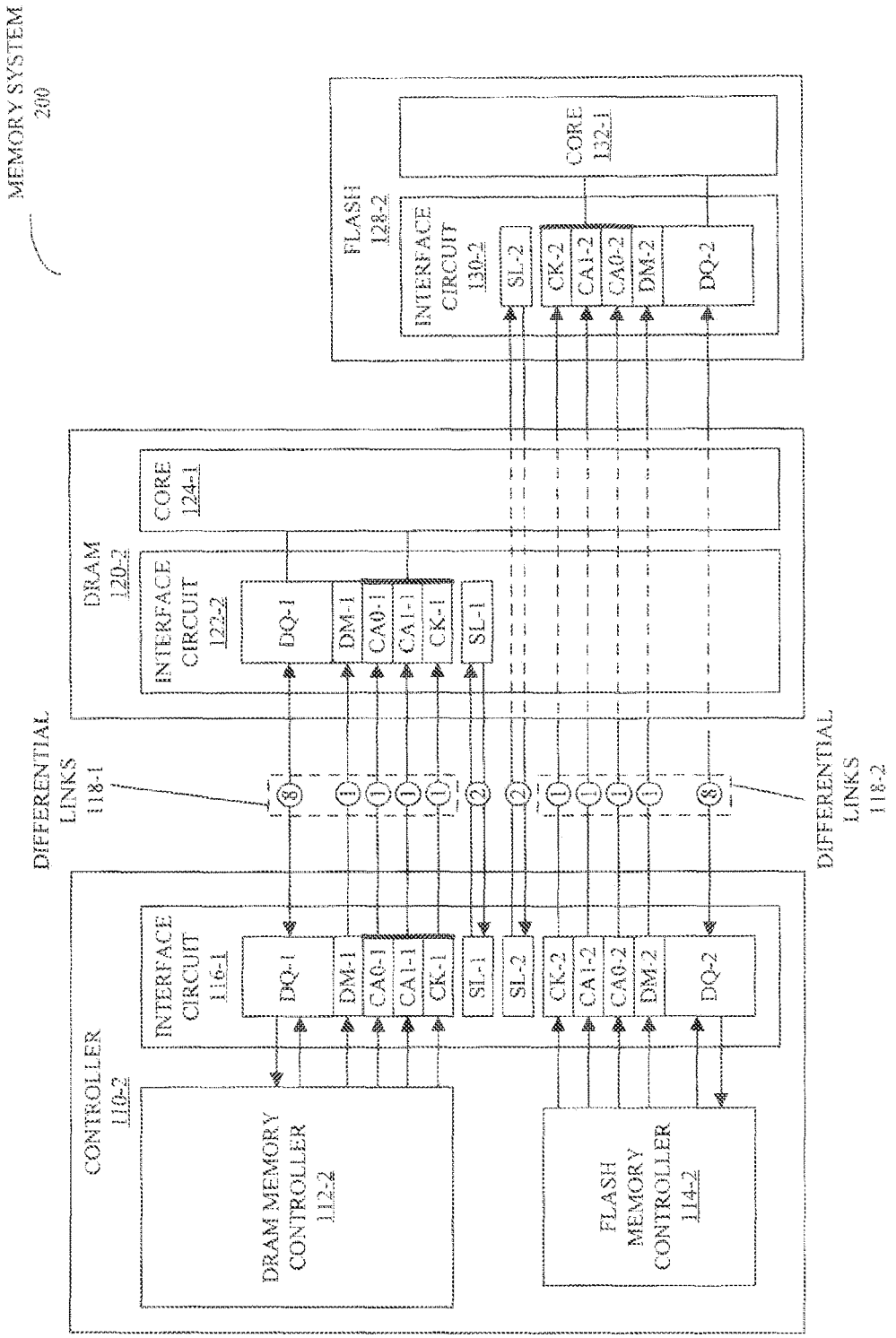
FIG. 2 is a block diagram illustrating an embodiment of a memory system.
Figure 3:
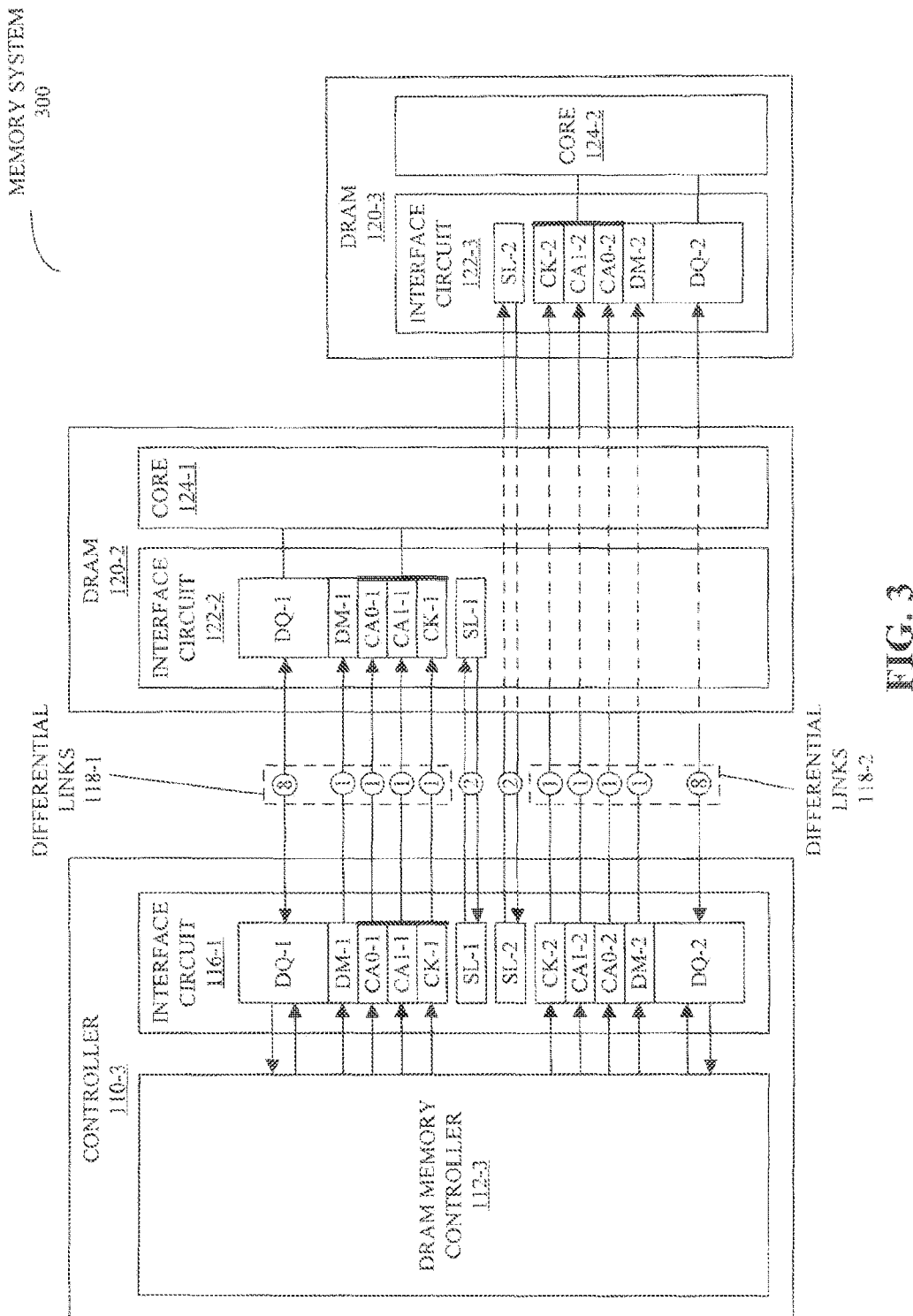
FIG. 3 is a block diagram illustrating an embodiment of a memory system.

Moreover, as shown in FIG. 2, which presents a block diagram illustrating an embodiment of a memory system 200, during another operating mode (henceforth referred to as the 'dedicated-link operating mode'), interface circuit 116-1 is reconfigured so that communication with flash memory 128-2 occurs via dedicated command/address (CA0-2 and CA1-2), data (DQ-2), data mask (DM-2), and clock (CK-2) links in differential links 118-2 using spatial multiplexing, i.e., by distributing the information on dedicated links In this memory system, differential links 118-2 may provide a high-bandwidth communication channel for flash memory 128-2, which with signaling rates and device bandwidths equal to the signaling rates and device bandwidths used for communication with DRAM 120-2 (and 120-1 in FIG. 1). Alternatively, as shown in FIG. 3, which presents a block diagram illustrating an embodiment of a memory system 300, during this dedicated-link operating mode, interface circuit 116-1 may be reconfigured so that communication with DRAM 120-3 occurs via the dedicated, differential links 118-2.

By reconfiguring the interface circuit in the controller to support different operating modes, the controller may be able to communicate with a variety of memory devices without degrading the communication performance. This additional flexibility may allow a single controller to be used in multiple applications, thereby reducing the cost of devices, such as portable electronic devices.

These integrated circuits and techniques may be used in a wide variety of systems, such as a wide variety of memory systems and memory devices, including: volatile memory, non-volatile memory, DRAM, static random-access memory (SRAM), read-only memory (ROM), erasable programmable read-only memory (EPROM), electrically erasable programmable read-only memory (EEPROM), NOR flash, NAND flash, solid-state memory, and/or other types of memory. Moreover, for a given type of memory, these techniques may be used in different memory technologies or technology generations (which may use different power supply voltages or signaling rates). For example, these techniques may be used in extreme data rate (XDR), double-data rate (DDR), graphics double-data rate (GDDR) and/or synchronous DRAM, such as: DDR2, DDR3, DDRx, GDDR1, GDDR3, GDDR5, and/or mobile DDR.

Additionally, integrated circuits and/or memory components (such as a memory controller, a memory device, a memory module, and/or a memory system) that use these techniques may be included in a wide variety of applications, such as: desktop or laptop computers, computer systems, hand-held or portable devices (e.g., personal digital assistants and/or cellular telephones), set-top boxes, home networks, and/or video-game devices. For example, a storage device (such as the memory module) may be included in computer main memory. Moreover, one or more of these embodiments may be included in a communication channel, such as: serial or parallel links, metropolitan area networks, local area networks (LANs), and/or personal area networks (PANs).

We now further describe embodiments of a reconfigurable memory controller. Continuing the discussion of FIG. 1, this memory system shows an x16 dual-GA link interface circuit 116-1 with x16-link DRAM 120-1 and x2-link flash memory 128-1. DRAM memory controller 112-1 in controller 110-1 (which is a block of logic that can be configured to operate with different memory devices, such as DRAM 120-1 and/or flash memory 128-1) may communicate information with DRAM 120-1 via interface circuit 116-1, differential links 118-1 and/or 118-2, and interface circuit 122-1. For example, data may be written to or read from core 124-1 in response to command/address information that is received from DRAM memory controller 112-1. While FIG. 1 illustrates the shared-link operating mode, note that only a subset of the links in interface circuit 116-1 may be shared. Thus, controller 110-1 communicates with DRAM 120-1 using differential links 118-1, which include eight dedicated signal connectors/links for data (DQ-1), one dedicated signal connector/link for a data mask (DM-1), two dedicated signal connectors/links for command/address information (CA0-1 and CA1-1), and a dedicated signal connector/link for the clock (CK-1). These dedicated, differential links 118-1 communicate information between controller 110-1 and DRAM 120-1 using spatial multiplexing, i.e., by distributing the information on dedicated links.

Moreover, flash memory controller 114-1 in controller 110-1 may communicate information with flash memory 128-1 via interface circuit 116-1, links 126-1, and interface circuit 130-1. For example, data may be written to or read from core 132-1 in response to command/address information that is received from flash memory controller 114-1.

As noted previously, communication with flash memory 128-1 occurs, at least in part, via shared, bidirectional CA/DQ links, which are reconfigured during the shared-link operating mode from their use as dedicated links during the dedicated-link operating mode. Note that, because CA0-2 and CA1-2 in interface circuit 116-1 are used for communicating with flash memory 128-1, CA0-2 and CA1-2 in interface circuit 122-1 are unused.

Because the CA0-2 and CA1-2 links are a shared resource, flash memory controller 114-1 may perform transaction scheduling. In particular, in order to properly interleave command/address packets and data packets, flash memory controller 114-1 may provide time-delay information between when flash memory 128-1 receives a request for data and when flash memory 128-1 provides the requested data. For example, control logic 108 (which, for convenience, is omitted in memory systems 200 in FIG. 2, 300 in FIGS. 3, and 400 in FIG. 4) may schedule use of links 126-1 by selecting a time delay, which is associated with given command/address information. This time-delay may be included in the command/address packets transmitted to flash memory 128-1 (as described further below with reference to FIG. 6C). Note that this time-delay information may be useful when there is bidirectional communication on the CA0-2 and CA1-2 links, such as when command/address packets are communicated to flash memory 128-1 and data, associated with a read operation, is communicated to flash memory controller 114-1.

Note that such shared links may be used with some flash memory devices because of a limited number of interface pins and/or a slower core speed associated with such memory devices. However, when the memory device supports high-bandwidth communication, controller 110-1 may reconfigure at least a portion of interface circuit 116-1 an that shared links become dedicated links, as shown in memory systems 200 (FIG. 2) and 300 (FIG. 3). (Thus, memory system 200 in FIG. 2 shows an x16 dual-CA link interface circuit 116-1 with x8, dedicated-link DRAM 120-2 and x8, dedicated-link flash memory 128-2. Similarly, memory system 300 in FIG. 3 shows an x16 dual-CA link interface circuit 116-1 with x8, dedicated-link DRAM 120-2 and x8, dedicated-link DRAM 120-3.)

Figure 4:
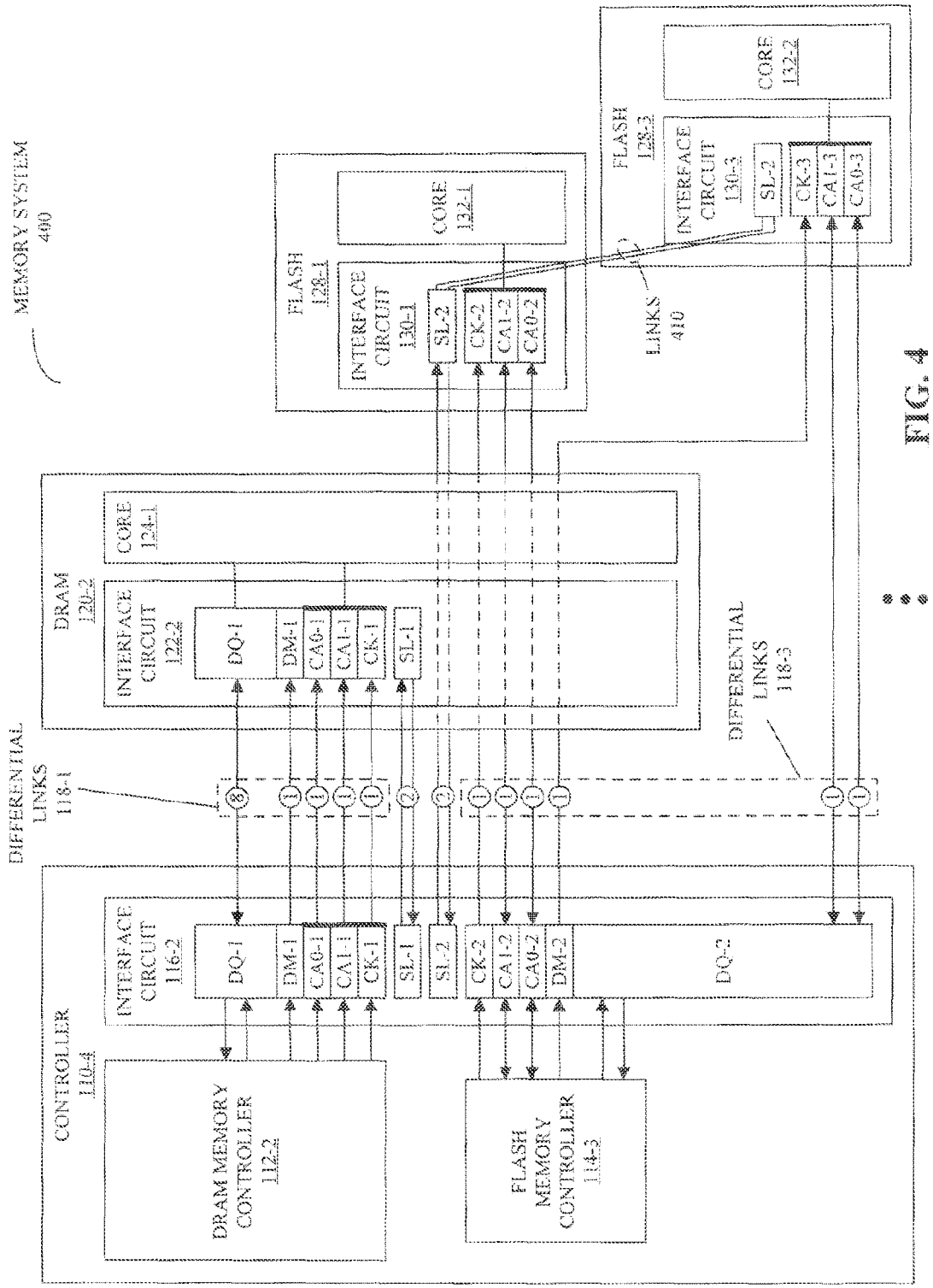
FIG. 4 is a block diagram illustrating an embodiment of a memory system.

In some embodiments, the current operating mode of controller 110-1 is specified by a value stored in register 106, such as a mode register (which, for convenience, is omitted in memory systems 200 in FIG. 2, 300 in FIG. 3, and 400 in FIG. 4). This stored value may be set or selected one or more times, such as when memory system 100 is assembled and/or initialized. While register 106 is used as an illustration in memory system 100, in other embodiments a variety of techniques may be used, including: a fuse, whose state (open or closed) indicates the current operating mode; a connector that receives a voltage (such as high or low) that indicates the current operating mode; and/or a node electrically coupled to an optional initialization bus (not shown), which receives information that specifies the current operating mode. Other techniques for specifying the current operating mode will also occur to those having familiarity with systems logic design.

As noted previously, the signaling rates during communication with memory devices, such as DRAM and flash memory, may be the same or different. Separately or additionally, the clock frequencies associated with communication with the memory devices may be the same or different. For example, the clock frequency associated with communication with flash memory 128-1 may be an integer fraction of the clock frequency associated with communication with DRAM 120-1. Alternatively, the clock frequency associated with communication with flash memory 128-2 (FIG. 2) may be the same as the clock frequency associated with communication with DRAM 120-2 (FIG. 2).

Figure 5:
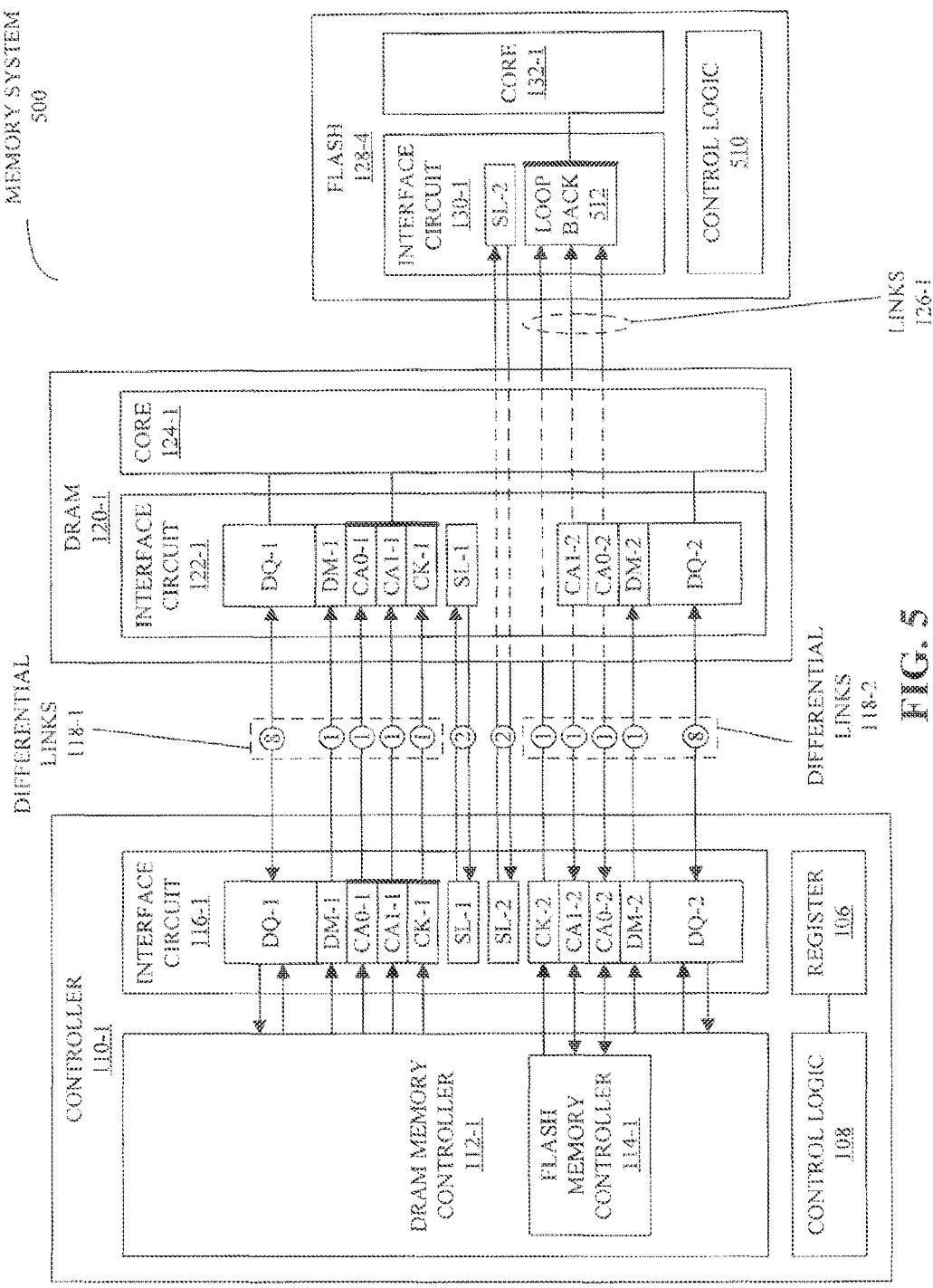
FIG. 5 is a block diagram illustrating an embodiment of a memory system.

In some embodiments, at least some of the links in the communication channels between controller 110-1 and DRAM 120-1, and between controller 110-1 and flash memory 128-1, may include: a point-to-point topology, differential links (such as links 118 and/or 126-1), ground-referenced links, low-swing signaling, parallel termination, and/or initial/periodic calibration with loopback path (as described further below with reference to FIG. 5). Moreover, in the shared-link operating mode, where there are shared, bidirectional CA/LV links, the communication between controller 110-1 and flash memory 128-1 may be half-duplex or full-duplex (if full-duplex communication is used, the signaling voltage on a link may be 1.5-2× larger and the receiver may subtract the transmitted signal).

In addition to DQ, DM, CA and CK links, there may also be sideband links (SL) between controller 110-1 and the memory devices. For example, there are two unidirectional sideband links associated with SL-1, between controller 110-1 and DRAM 120-1. Moreover, there are two unidirectional sideband links associated with SL-2 between controller 110-1 and flash memory 128-1. These sideband links may be communicate bidirectional single-ended signals (for example, using rail-to-rail CMOS) and may be able to operate without initial or periodic calibration.

Sideband links SL-1 between controller 110-1 and DRAM 120-1 (as well as sideband links SL-2 between controller 110-2 and flash memory 128-2 during the dedicated-link operating mode in FIG. 2, and sideband links SL-2 between controller 110-2 and DRAM 120-3 during the dedicated-link operating mode in FIG. 3) may communicate initialization information and power-management information. However, sideband links SL-2 between controller 110-1 and flash memory 128-1 (and, more generally, the sideband links for those memory devices that communicate using at least some shared CA/DQ links during the shared-link operating mode) may communicate: initialization information, power-management information, and/or feedback from flash memory 128-1 to controller 110-1. This feedback may include interrupt or other memory-device-initiated information that stops communication in the event of a problem (e.g. a degradation in communication performance).

For example, sideband signals on sideband links may be non-calibrated (e.g., the sideband links may include CMOS wires as opposed to differential links). These low-speed sideband signals on the two sideband links associated with SL-2 can be used to get a high-speed calibrated link (such as links 126-1) running at startup.

Additionally or separately, these sideband links can be used to provide power-management for flash memory 128-1. For example, the clock can be stopped (a low-power state) and started without time delay by using the two sideband links associated with SL-2 as an asynchronous power enable.

While FIGS. 1-3 show dedicated sideband links between controllers 110 and memory devices, in some embodiments two or more sideband links may be shared between multiple memory devices. This is shown in FIG. 4, which presents a block diagram illustrating an embodiment of a memory system 400. In particular, this memory system includes an x16 dual-CA link interface circuit 116-2 with x8-link DRAM 120-2 and four x2-link flash memory 128 devices (for convenience, only two of the flash memory devices are shown). Moreover, at least two of the flash memory 128 devices, flash memory 128-1 and flash memory 128-3, may share the two sideband links associated with SL-2 via links 410.

In memory systems (such as memory system 400) that include multiple memory devices (such as the flash memory 128 devices), dedicated DQ links (such as links DQ-2) in the dedicated-link operating mode may be reconfigured in order to provide sufficient shared CA/DQ links during the shared-link operating mode. Moreover, dedicated CA or DQ links during the dedicated-link operating mode may be reconfigured to communicate a clock during the shared-link operating mode. For example, link DM-2 can be reconfigured to communicate CK-3 to flash memory 128-3. This may be implemented by including a multiplexer in interface circuit 116-2 so that the data or clock may be selectively electrically coupled (based on the operating mode) to a driver, and thus, to the DM-2 link. Note that, because the driver for this link is shared in the two operating modes, the input capacitance is approximately the same (as opposed to embodiments where separate drivers are used for this link during the two operating modes). This may facilitate high-bandwidth communication with the memory devices in the different operating modes. Additionally, the driver for this link may be shared even when the data rate is a fraction of the 'normal' data rate because the fractional signaling cart be handled using multiplexing logic in the transmitter serialier.

As noted previously, in some embodiments, shared CA/DQ links may be calibrated, for example, during a calibration mode. For example, control logic 108 and 510 may calibrate at least two CA/DQ links and a CK link using a loopback 512 path, as shown in FIG. 5, which presents a block diagram illustrating an embodiment of a memory system 500. This calibration may include: timing (or phase), impedance and/or voltage calibration of at least some of the links 126-1. Note that the calibration may be performed: when controller 110-1 is initialized, after the initialization during the calibration mode, and/or during operation of the memory system 500 (for example, during the shared-link operating mode).

Memory systems 100 (FIG. 1), 200 (FIG. 2), 300 (FIG. 3), 400 (FIG. 4), and 500 may include fewer components or additional components. Moreover, two or more components may be combined into a single component and/or the position of one or more components may be changed.

Components and/or functionality illustrated in these embodiments may be implemented using analog circuits and/or digital circuits. Furthermore, the components and/or the functionality may be implemented using hardware and/or software. For example, controllers 110 (FIGS. 1-5) may be included in a processor or a processor core.

Figure 6A:
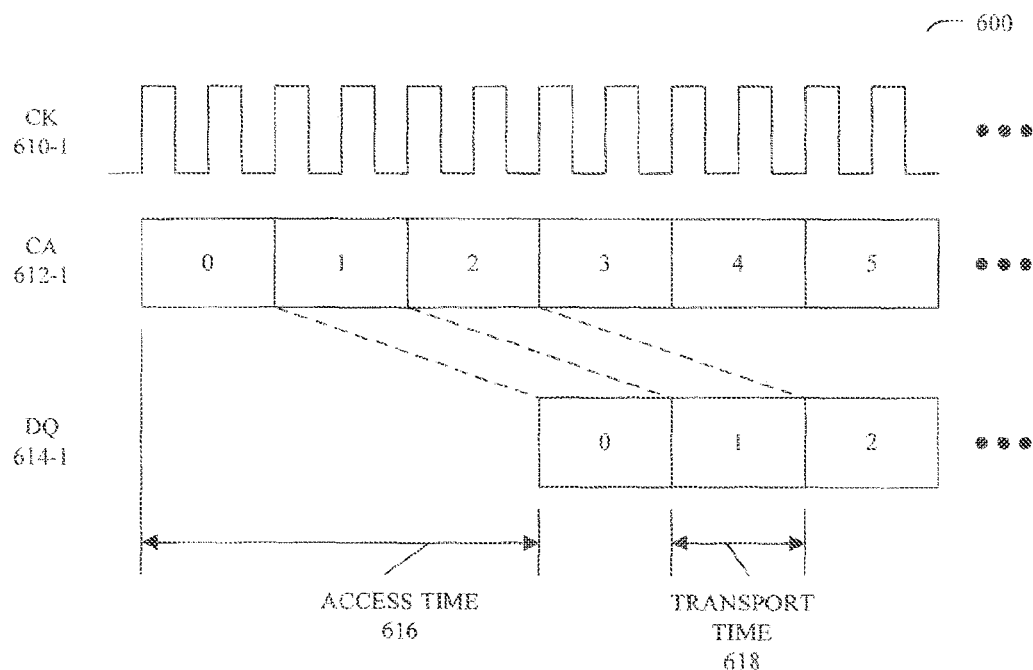
FIG. 6A is a timing diagram illustrating an embodiment of an interface protocol.

We now describe interface protocols for use with interface circuits 116, 122 and 130 (FIGS. 1-5). FIG. 6A presents a timing diagram illustrating an embodiment of an interface protocol 600. This interface protocol may be used for high-bandwidth communication with DRAM during the dedicated-link operating mode. In this interface protocol, command/address packets are conveyed during time slots on CA 612-1 fink based on either or both edges of clock (CK) 610-1. For each time slot on the CA 612-1 link, there is a corresponding data packet in a data time slot on data (DQ) link 614-1 (which may include multiple links, depending on the width or size of the data packets). Moreover, the data time slots are time shifted (or delayed) relative to their corresponding command/address time slot by an access time 616 associated with a given memory device, and the data time slots may have a duration associated with a transport time 618. Note that the time shifting and independence of the CA 612-1 link and the DQ 614-1 link make it easier to schedule use of these resources.

Figure 6B:
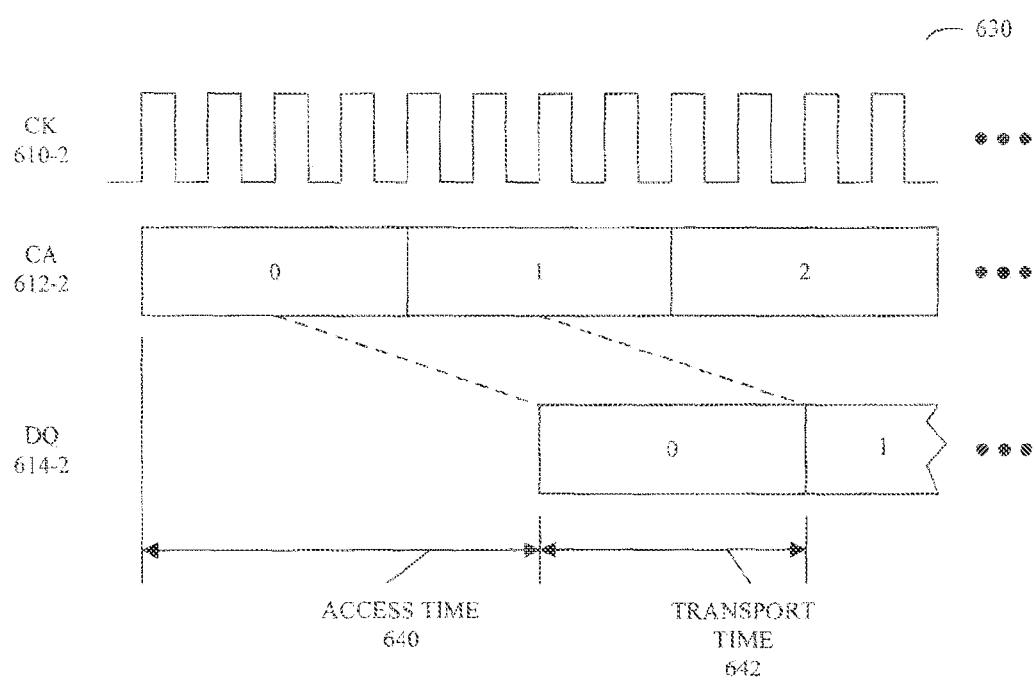
FIG. 6B is a timing diagram illustrating an embodiment of an interface protocol.

FIG. 6B presents a timing diagram illustrating an embodiment of an interface protocol 630. This interface protocol may be used for moderate-bandwidth communication with flash memory during the dedicated-link operating mode. While there are once again separate command/address and data resources in interface protocol 630, the signaling rate on CA 612-2 link and DQ 614-2 link may less than or equal to the signaling rate on CA 612-1 link (FIG. 6A) and DQ 614-1 link (FIG. 6A), even if clock 610-2 is the same as clock 610-1 (FIG. 6A) because of slower processes in flash memory devices. Moreover, access time 640 and transport time 642 for the flash memory device may be different than the corresponding times for DRAM shown in FIG. 6A.

Figure 6C:
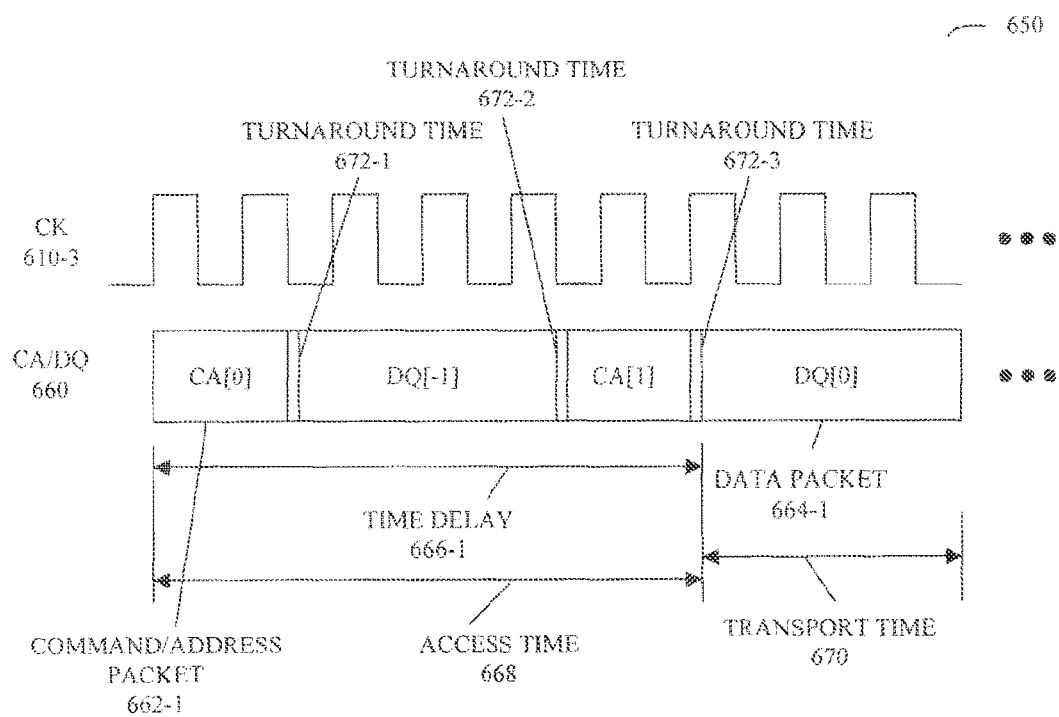
FIG. 6C is a timing diagram illustrating an embodiment of an interface protocol.

FIG. 6C presents a tithing diagram illustrating an embodiment of an interface protocol 650. This interface protocol may be used for moderate-bandwidth communication with flash memory during the shared-link operating mode. In this embodiment, data and command/address packets may be communicated on two links (as opposed to eight links for data packets and two links for command/address packets in FIGS. 6A and 6B). Consequently, transport time 670 may be four times larger than transport times 618 (FIG. 6A) and 642 (FIG. 6B). (However, note that, in other embodiments, command/address packets and data packets may be communicated with flash memory during the shared-link operating mode using four, eight or more shared CA/DQ links.) Moreover, in addition to the access time, a turnaround time is included in access time 668 because, for a sequence of read operations, CA packets and DQ packets move in opposite directions on the shared link.

Moreover, CA/DQ link 660 is a shared resource, which communicates command/address packets (such as command/address packet 662-1) and data packets (such data packet 664-1). In general, transport times can vary from data packet to data packet. This can make it difficult to schedule use of this shared resource (for example, by changing the temporal relationship between the transport times and the access time).

However, note that a time delay (such as time delay 666-1) between when a given command/address packet is sent (such as command/address packet 662-1) and when the given memory device should provide the corresponding data (such as data packet 664-1), which is needed to appropriately schedule use of CA/DQ link 660, is deterministic. For example, the time delay for the given command/address packet may be determined of selected based on: a known sequence of commands that have been or will be communicated on CA/DQ link 660, a known amount of data associated with each of these commands, and/or a known access time for the given memory device.

(In this embodiment, time delay 666-1 equals access time 668. In general, the time delay may be different than the access time. In particular, time delay 666-1 equals the largest of the access time or the summation of the packet length of CA[0] plus turnaround time 672-1 plus the packet length of DQ[−1] plus turnaround time 672-2 plus the packet length of CA[1]. Moreover, the turnaround time is included when the command associated with a data packet is a read operation, which is communicated in the opposite direction on CA/DQ 660 link from command/address packets. For other operations, such as a write, the access time plus the turnaround time may be replaced by the access time of the given memory device.)

Consequently, control logic (such as control logic 108 in FIG. 1) may determine the appropriate time delay associated with the given command/address packet and may communicate this time delay in a field in the given command/address packet. In some embodiments, the time delay is fixed. However, in other embodiments the time delay may vary from one command/address packet to another. Moreover, the time delay may be determined dynamically or selected from a pre-determined set of values (such as integer multiples of a minimum time delay).

In some embodiments, the time delay is the greater of a sum of the access time 668 plus the turnaround time of the given memory device which is associated with the given command/address packet. Note that access time 668 plus the turnaround time may be defined from a beginning of transport of the given command/address packet to a beginning of transport of the requested data (e g., from a beginning of command/address packet 662-1 to a beginning of data packet 664-1). Moreover, the sum may include: two command/address transport times, a previous data transport time associated with the previous command/address packet, three times a turnaround time of the given memory device if the previous command/address packet included a read, operation, and the turnaround time if the given command/address packet includes a read operation.

In some embodiments, the schedule determined, by the control logic (or equivalently, the time delays communicated to the given memory device) includes turnaround times of the given memory device between the given command/address packet and data associated with a read operation.

In some embodiments, the time delay is based on two or more previous data transport times. Alternatively or additionally, the time delay may be selected from a set of pre-determined values based on an index value in the given command/address packet and state information associated with a previous transport time and data type.

Note that in interface protocols 600 (FIG. 6A), 630 (FIG. 6B), and 650, two data bits or symbols are communicated per clock cycle.

Figure 7:
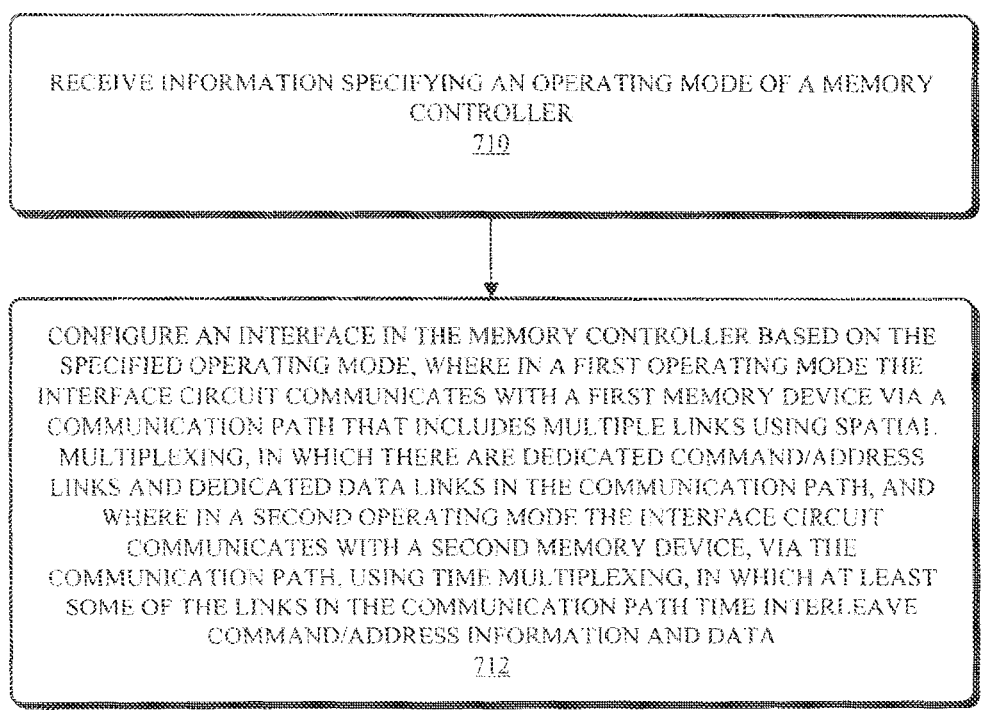
FIG. 7 is a flow chart illustrating an embodiment of a process for reconfiguring a memory controller.

We now describe embodiments of a process for reconfiguring a memory controller. FIG. 7 presents a flow chart illustrating an embodiment of a process 700 for reconfiguring a memory controller. During this process, information specifying an operating mode of the memory controller is received (710). Then, an interface in the memory controller is configured based on the specified operating mode (712), where in a first operating mode, the interface circuit communicates with a first memory device via a communication path that includes multiple links using spatial multiplexing, in which there are dedicated command/address links and dedicated data links in the communication path. Moreover, in a second operating mode, the interface circuit communicates with the second memory device, via, the communication path, using time multiplexing, in which at least some of the links in the communication path time interleave command/address information and data.

In some embodiments of the process 700 there are fewer or additional operations. Moreover, two or more operations may be combined into a single operation and/or a position of one or more operations may be changed.

Devices and circuits described herein may be implemented using computer-aided design tools available in the art, and embodied by computer-readable files containing software descriptions of such circuits. These software descriptions may be: behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 8:
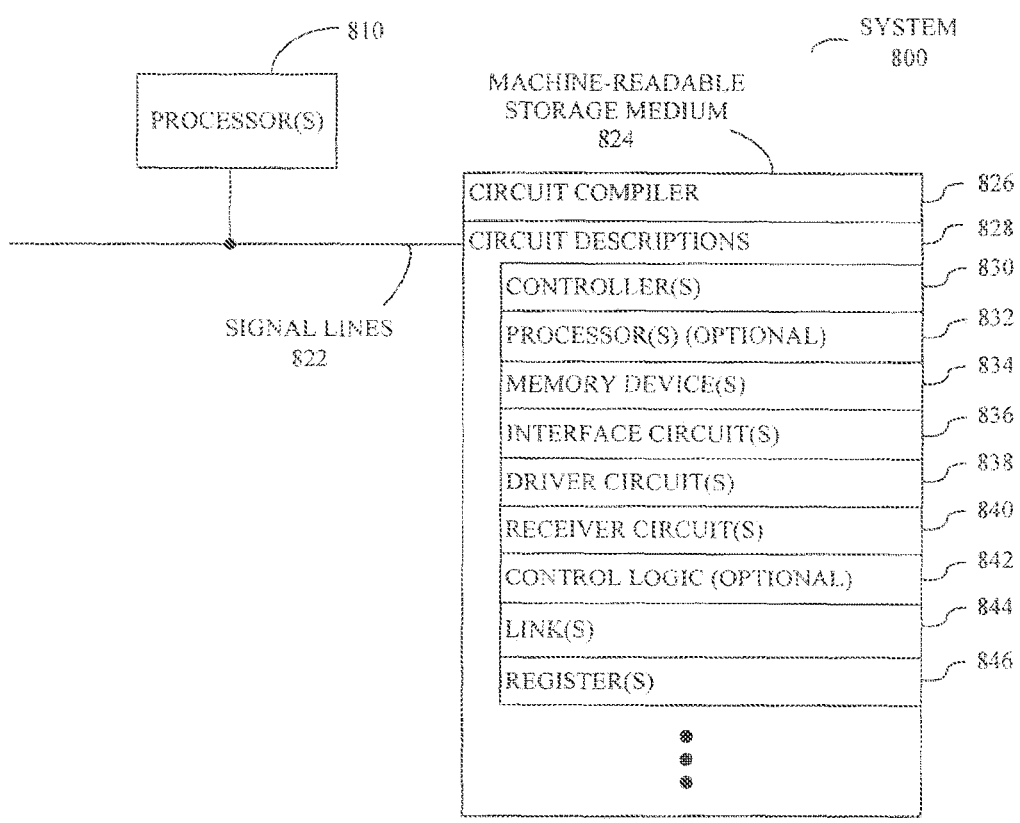
FIG. 8 is a block diagram illustrating an embodiment of a system.

FIG. 8 presents a block diagram illustrating an embodiment of a system 800 that stores such computer-readable files. This system may include at least one data processor or central processing unit (CPU) 810, machine-readable storage medium 824 and one or more signal lines or communication buses 822 for coupling these components to one another. Machine-readable storage medium 824 may include: high-speed random access memory and/or non-volatile memory, such as: ROM, RAM, EPROM, EEPROM, flash memory, one or more smart cards, one or more magnetic disc storage devices, and/or one or more optical storage devices.

Machine-readable storage medium 824 may store a circuit compiler 826 and circuit descriptions 828. Circuit descriptions 828 may include descriptions of the circuits, or a subset of the circuits discussed above with respect to FIGS. 1-5. In particular, circuit descriptions 828 may include circuit descriptions of: one or more controllers 830 (such as one or more memory controllers), optional processors 832, one or more memory devices 834, one or more interface circuits 836, one or more driver circuits 838. One or more receiver circuits 840, optional control logic 842, one or more links 844, and/or one or more registers 846.

In some embodiments, system 800 includes fewer or additional components. Moreover, two or more components may be combined into a single component and/or a position of one or more components may be changed.

In some embodiments, a memory controller includes signal connectors, which are electrically coupled to a communication path that includes multiple links, and an interface circuit, which is electrically coupled to the signal connectors. In a first operating mode, the interface circuit communicates with a first memory device via the communication path using spatial multiplexing, in which there are dedicated command address links and dedicated data links in the communication path. Moreover, in a second operating mode, the interface circuit communicates with a second memory device via the communication path using time multiplexing, in which at least some of the links in the communication path time interleave command/address information and data.

In some embodiments, the first memory device is of a different type than the second memory device.

In some embodiments, the first memory device includes dynamic random access memory (DRAM) and the second memory device includes flash memory.

In some embodiments, the memory controller includes a register to store information specifying a given operating mode, which can be the first operating mode or the second operating mode.

In some embodiments, a given operating mode, which can be the first operating mode or the second operating mode, is selected once.

In some embodiments, the memory controller includes control logic, where, during the second operating mode, the control logic schedules use of the at least some of the links by selecting a time delay, which is associated with given command/address information, for the second memory device to provide requested data. Moreover, information associated with the time delay may be included in the given command/address information that is communicated to the second memory device.

In some embodiments, the time delay is the greater of a sum of an access time of the second memory device associated with the given command/address information, which is defined from a beginning of transport of the given command/address information to a beginning of transport of the requested data Moreover, the sum may include: two command/address transport times, a previous data transport time associated with previous command/address information, three times a turnaround time of the second memory device if the previous command/address information included a read operation, and the turnaround time if the given command/address information includes a read operation.

In some embodiments, the schedule determined by the control logic includes turnaround times of the second memory device between the given command/address information and data associated with a read operation.

In some embodiments, the time delay is based on two or more previous data transport times. Alternatively, or additionally, the time delay may be selected from a set of pre-determined values based on an index value in the given command/address information and state information associated with one or more previous states, previous transport times and/or previous data-transfer types. In some embodiments, the time delay is dynamically specified in a dedicated field in the given command/address information.

In some embodiments, during the second operating mode, if the second memory device includes multiple memory devices that include flash memory, the interface circuit communicates a clock signal on a link that communicates data in the first operating mode. Moreover, during the second operating mode, a second clock frequency associated with the communication is less than or equal to a first clock frequency associated with the communication during the first operating mode. For example, the second clock frequency may be an integer fraction of the first clock frequency or the second clock frequency may be the same as the first clock frequency. Note that communication with the second memory device may have a lower signaling rate than communication with the first memory device.

In some embodiments, the first operating mode and the second operating mode facilitate reconfiguration of the memory controller for use in different applications. For example, the different applications may include different data packet sizes (which can include the packet length, such as a number of data transfers, and/or a packet width, such as the bytes per data transfer), different capacities and/or different device types. Note that different data packet sizes may include a different number of links in the multiple links which are used to communicate data to a given memory device, which can be the first memory device or the second memory device.

In some embodiments, the time interleaving is associated with read operations.

In some embodiments, the at least some of the links include a differential link and/or are terminated by parallel termination.

In some embodiments, during the second operating mode, one or more additional links, which communicate command/address information or data in the first operating mode, communicate a clock signal to the second memory device. These one or more additional links may be distinct from the at least some of the links.

In some embodiments, the second memory device may be electrically coupled to the memory controller in a point-to-point connection topology.

In some embodiments, during the second operating mode, the interface circuit performs a calibration using the at least some of the links and a clock link in a loopback path. This calibration may include timing, impedance and/or voltage calibration of the at least some of the links. Note that the calibration may be performed: when the memory controller is initialized in a memory system that includes the memory controller, after the initialization during a calibration mode, and/or during operation of the memory system that includes the memory controller.

In some embodiments, the communication path in the first operating mode and the second operating mode includes a side-band link. During the first operating mode, the side-band link may communicate initialization information and power-management information. Moreover, during the second operating mode, the side-band link may communicate initialization information, power-management information, and feedback from the second memory device to the memory controller. This feedback may include interrupt information. Note that, in embodiments where the second memory device includes multiple memory devices, the side-band link may be shared by the multiple memory devices.

In some embodiments, a driver in the interface circuit provides a data signal in the first operating mode and a clock signal in the second operating mode.

In some embodiments, the memory controller is disposed or implemented on an integrated circuit.

Another embodiment provides a system that includes a memory device (which can be a first memory device or a second memory device), the communication path (which includes the multiple links, and which is electrically coupled to the memory device), and the memory controller (which is electrically coupled to the communication path).

Another embodiment provides a method for reconfiguring a memory controller. During this method, information specifying an operating mode of the memory controller is received. Then, an interface in the memory controller is configured based on the specified operating mode, where in a first operating mode, the interface circuit communicates with a first memory device via a communication path that includes multiple links using spatial multiplexing, in which there are dedicated command/address links and dedicated data links in the communication path. Moreover, in a second operating mode, the interface circuit communicates with the second memory device, via the communication path, using time multiplexing, in which at least some of the links in the communication path time interleave command/address information and data.

The preceding description has been presented to enable any person skilled in the art to make and use the disclosed embodiments, and was provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Moreover, the foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A non-transitory machine-readable medium storing a representation of a memory controller that comprises:
    signal connectors to electrically couple to a communication path that includes multiple links, the communication path for electrically coupling to a memory device that can be a first memory device or a second memory device; and
    an interface circuit electrically coupled to the signal connectors and configurable to operate in either a first operating mode or a second operating mode depending on a type of the memory device coupled to the communication path,
        wherein, in the first operating mode, when the memory device is the first memory device, the interface circuit is to communicate with the first memory device via the communication path using spatial multiplexing, in which there are dedicated command/address links and dedicated data links in the communication path;
        wherein, in the second operating mode, when the memory device is the second memory device instead of the first memory device, the interface circuit is to communicate with the second memory device via the communication path using time multiplexing, in which at least some of the multiple links in the communication path time interleave command/address information and data, the second memory device being of a different type from the first memory device; and
    control logic to schedule use of at least some of the multiple links based on configuration information specifying a given operation mode.

2. The non-transitory machine-readable medium of claim 1, wherein the memory controller further comprises additional signal connectors to electrically couple to an additional communication path that includes multiple links, wherein the interface circuit is electrically coupled to the additional signal connectors, and wherein in either the first operating mode or the second operating mode, the interface circuit is to communicate via the additional communication path using spatial multiplexing, in which there are dedicated command/address links and dedicated data links in the additional communication path.

3. The non-transitory machine-readable medium of claim 1, wherein the memory controller further comprises a register to store the configuration information specifying the given operating mode.

4. The non-transitory machine-readable medium of claim 1, wherein the given operating mode is to be selected once.

5. The non-transitory machine-readable medium of claim 1, wherein during the second operating mode, the control logic is to schedule use of the at least some of the multiple links by selecting a time delay, which is associated with given command/address information, for the second memory device to provide requested data; and
    wherein information associated with the time delay is to be included in the given command/address information to be communicated to the second memory device.

6. The non-transitory machine-readable medium of claim 5, wherein the time delay is the greater of a sum of an access time of the second memory device associated with the given command/address information, which is defined from a beginning of transport of the given command/address information to a beginning of transport of the requested data; and
    wherein the sum includes two command/address transport times, a previous data transport time associated with previous command/address information, three times a turnaround time of the second memory device if the previous command/address information included a read operation, and the turnaround time if the given command/address information includes a read operation.

7. The non-transitory machine-readable medium of claim 5, wherein a schedule determined by the control logic includes turnaround times of the second memory device between the given command/address information and data associated with a read operation.

8. The non-transitory machine-readable medium of claim 5, wherein the time delay is based on two or more previous data transport times.

9. The non-transitory machine-readable medium of claim 5, wherein the time delay is selected from a set of pre-determined values based on an index value in the given command/address information and state information associated with a previous transport time and data type.

10. The non-transitory machine-readable medium of claim 5, wherein the time delay is dynamically specified in a dedicated field in the given command/address information.

11. The non-transitory machine-readable medium of claim 1, wherein, during the second operating mode, if the second memory device includes multiple memory devices that include flash memory, the interface circuit is to communicate a clock signal on a link that communicates data in the first operating mode.

12. The non-transitory machine-readable medium of claim 1, wherein, during the second operating mode, a second clock frequency associated with communication is less than or equal to a first clock frequency associated with communication during the first operating mode.

13. The non-transitory machine-readable medium of claim 1, wherein communication with the second memory device has a lower signaling rate than communication with the first memory device.

14. The non-transitory machine-readable medium of claim 1, wherein the first operating mode and the second operating mode facilitate reconfiguration of the memory controller for use in different applications.

15. The non-transitory machine-readable medium of claim 14, wherein the different applications include different data packet sizes, different capacities or different device types; and
   wherein different data packet sizes include a different number of links in the multiple links which are used to communicate data to a given memory device, which can be the first memory device or the second memory device.

16. The non-transitory machine-readable medium of claim 1, wherein the time interleaving is associated with read operations.

17. The non-transitory machine-readable medium of claim 1, wherein, during the second operating mode, the interface circuit is to perform a calibration using the at least some of the multiple links and a clock link in a loop back path; and
   wherein the calibration includes timing calibration of the at least some of the multiple links.

18. The non-transitory machine-readable medium of claim 1, wherein the communication path in the first operating mode and the second operating mode includes a side-band link;
   wherein, during the first operating mode, the side-band link is to communicate initialization information and power-management information;
   wherein, during the second operating mode, the side-band link is to communicate initialization information, power-management information, and feedback from the second memory device to the memory controller; and
   wherein the feedback includes interrupt information.

19. The non-transitory machine-readable medium of claim 1, wherein a driver in the interface circuit provides a data signal in the first operating mode and a clock signal in the second operating mode.

20. A non-transitory machine-readable medium storing a representation of a memory controller that comprises:
   signal connectors to electrically couple to a communication path that includes multiple links, the communication path for electrically coupling to a memory device that can be a first memory device or a second memory device; and
   means for communicating, which is electrically coupled to the signal connectors,
   wherein, in a first operating mode when the memory device is the first memory device, the means is to communicate with the first memory device via the communication path using spatial multiplexing, in which there are dedicated command/address links and dedicated data links in the communication path; and
   wherein, in a second operating mode when the memory device is the second memory device, the means is to communicate with the second memory device via the communication path using time multiplexing, in which at least some of the multiple links in the communication path time interleave command/address information and data.

* * * * *